US005851434A

United States Patent [19]
Galante et al.

[11] Patent Number: 5,851,434
[45] Date of Patent: Dec. 22, 1998

[54] KETONE-BASED SURFACTANT AND METHOD FOR TREATING INDUSTRIAL, COMMERCIAL, AND INSTITUTIONAL WASTE-WATER

[75] Inventors: Denise Christine Galante; Richard Charles Hoy; Albert Ferris Joseph, all of Charleston; Stephen Wayne King, Scott Depot; Charles Arnold Smith, Charleston; Cheryl Marie Wizda, Cross Lanes, all of W. Va.

[73] Assignee: Union Carbide Chemicals & Plastics Technology Corporation, Danbury, Conn.

[21] Appl. No.: 978,920

[22] Filed: Nov. 26, 1997

Related U.S. Application Data

[62] Division of Ser. No. 439,953, May 12, 1995, Pat. No. 5,744,064.

[51] Int. Cl.$^6$ .............................. B01D 17/04; B01F 17/00; D21C 5/02; C11D 3/16
[52] U.S. Cl. .............................. 252/358; 148/22; 162/4; 162/5; 510/331; 510/340; 510/513; 510/531; 510/535
[58] Field of Search .............................. 252/358; 148/22; 162/4, 5; 510/331, 340, 513, 531, 535

[56] References Cited

U.S. PATENT DOCUMENTS

| | | | |
|---|---|---|---|
| 2,786,081 | 3/1957 | Kress | 260/615 |
| 2,796,401 | 6/1957 | Matuszak et al. | 252/42 |
| 2,905,719 | 9/1959 | de Benneville et al. | 260/609 |
| 3,058,981 | 10/1962 | Avakian et al. | 260/247.2 |
| 3,201,420 | 8/1965 | Fuzesi et al. | 260/340.7 |
| 3,244,753 | 4/1966 | Leary | 260/613 |
| 3,725,438 | 4/1973 | Barone et al. | 260/340.9 |
| 3,909,460 | 9/1975 | McCoy | 252/532 |
| 3,931,337 | 1/1976 | Langdon | 260/615 A |
| 3,948,953 | 4/1976 | McCoy | 260/340.9 |
| 4,060,532 | 11/1977 | Hartmann | 360/340.9 R |
| 4,118,565 | 10/1978 | Scherf | 544/87 |
| 4,189,609 | 2/1980 | Langdon | 568/601 |
| 4,198,294 | 4/1980 | Deane | 210/23 F |
| 4,231,841 | 11/1980 | Calmanti et al. | 162/5 |
| 4,360,439 | 11/1982 | Calmanti et al. | 252/61 |
| 4,408,084 | 10/1983 | Langdon | 568/601 |
| 4,483,741 | 11/1984 | Maloney et al. | 162/5 |
| 4,605,773 | 8/1986 | Maloney et al. | 564/505 |
| 4,675,125 | 6/1987 | Sturwold | 252/118 |
| 4,977,281 | 12/1990 | Miley et al. | 549/373 |
| 5,076,937 | 12/1991 | Montgomery | 210/705 |
| 5,114,607 | 5/1992 | Deck et al. | 252/156 |
| 5,137,654 | 8/1992 | Burke | 252/306 |
| 5,167,829 | 12/1992 | Diamond et al. | 210/708 |
| 5,207,922 | 5/1993 | McFarlan et al. | 210/708 |
| 5,246,590 | 9/1993 | Dobrez et al. | 210/705 |
| 5,340,469 | 8/1994 | Montgomery | 210/96.1 |
| 5,744,064 | 4/1998 | Galante et al. | 252/358 |
| 5,744,065 | 4/1998 | Galante et al. | 252/358 |

FOREIGN PATENT DOCUMENTS

| | | |
|---|---|---|
| 0054366 | 11/1981 | European Pat. Off. . |
| 0071019 | 9/1983 | European Pat. Off. . |
| 1302969 | 1/1976 | France . |
| 3318592 | 11/1984 | Germany . |
| 3441542 | 5/1986 | Germany . |
| 414772 | 8/1934 | United Kingdom . |

OTHER PUBLICATIONS

"Surfactants in Consumer Products", Edited by J. Falbe, *Springer–Verlag Heidelberg* (1987) pp. 9–22.
"Cleavable Surfactants of the Acetal Type", Ono et al., *Tenside Surf. Det.* 29 (1992) 6, pp. 412–417.
"Preparation of New Acetal Type Cleavable Surfactants from Epichlorohydrin", Ono et al., *J. Org. Chem*, 1990, 55, pp. 4461–4464.
"Preparation and Characterization of Double–Chain Destructible Surfactants and Derived Vesicles", Jaeger et al., *JAOCS*, vol. 64, No. 11 (Nov. 1987) pp. 1550–1551.
"Chemical structure and surface activity, Part III. Synthesis and surface activity of ethoxylated 2–alkyl–4–hydroxymethyl–1,3–dioxolanes", Weclas et al., *Tenside Detergents* 18 (1981) 1, pp. 19–22.
"Synthesis and Surface Properties of Chemodegradable Anionic Surfactants: sodium Salts of Sulfated 2–n–Alkyl–5–Hdyroxymethyl–5–Methyl–1,3–Dioxanes", Sokolowski et al., *JAOCS*, vol. 69, No. 7 Jul. 1992 pp. 633–638.
"Synthesis and Properties of Destructible Anionic and Cationic Surfactants with a 1,3–Dioxolane Ring", Yamamura et al., *JAOCS*, vol. 66, No. 8 (Aug. 1989) pp. 1165–1170.
"Alkoxyalkyl–Substituted Glycerol Acetals: New Hydrophobic Intermediates for Surfactant Synthesis", Piasecki, *JAOCS*, vol. 69, No. 7 (Jul., 1992) pp. 639–642.
"Preparation and Characterization of Glycerol–Based Cleavable Surfactants and Derived Vesicles", Jaeger et al., *J.Am.Chem.Soc.*, No. 8, 1989, 111, pp. 3001–3006.
"Second Generation Single–Chain Cleavable Surfactants", Jaeger, et al., *Tetrahedron Letters*, vol. 31, No. 4 (1990) pp. 449–450.
" 'Destructible' Surfactants Based on a Ketal Group", Jaeger, et al., *J.Org.Chem.*, 1984, 49, pp. 4545–4547.
"Structual Effects on the Properties of Nonionic Surfactants. I. The Synthesis and Some Surface Activities of Acetal Type Homogeneous Nonionics", Kuwamura et al., *Bulletin of the Chemical Society of Japan*, vol. 45, (1972) pp. 617–622.
CA 123:202975 1994.

*Primary Examiner*—Shean C. Wu
*Attorney, Agent, or Firm*—Sharon H. Hegedus

[57] ABSTRACT

A nonionic surfactant having cyclic 1,3-dioxane and/or 1,3-dioxolane functionality which is irreversibly splittable by lowering the pH of its aqueous solution is useful in various processes requiring the removal of emulsified hydrophobic contaminants or other hydrophobic materials from an aqueous stream. After splitting of the surfactant into its component ketone and polyol, the hydrophobic components phase-separate and can be removed from the aqueous stream by routine means.

9 Claims, No Drawings

KETONE-BASED SURFACTANT AND METHOD FOR TREATING INDUSTRIAL, COMMERCIAL, AND INSTITUTIONAL WASTE-WATER

This application is a division of prior U.S. application Ser. No. 08/439,953 filing date May 12, 1995, now U.S. Pat. No. 5,744,064.

BACKGROUND OF THE INVENTION

1. Technical Field

This invention relates to nonionic splittable surfactants and their use in industrial, commercial, and institutional applications which process aqueous streams, typically effluent streams, bearing water-insoluble, oily or waxy contaminants/impurities, including fats, oils and grease (FOGs), total petroleum hydrocarbons (TPHs), and other such hydrophobic materials. This invention provides compositions and methods designed to allow treatment of said aqueous streams to remove such hydrophobic materials. These aqueous streams generated during processing contain said contaminants which are held in the form of a relatively stable emulsion by the action of said surfactants. The contaminants may be removed from the aqueous effluent by acidifying the waste water, resulting in a release of said contaminants. Specific examples of said effluents include spent laundry wash water, contaminated oil/water emulsions from metalworking processes, aqueous streams from textile dyeing, aqueous wash streams from metal (vehicle) cleaning operations, waste or recycle streams from deinking processes, etc.

2. Discussion of the Prior Art

Direct discharge of contaminants or discharge of contaminants to a Public Owned Treatment Works (POTW) presents significant problems to numerous industries, e.g., industrial laundries, metalworking, food processing, metal cleaning, etc., which generate large volumes of aqueous effluents containing FOG, TPH, and/or other emulsified oils (organics) commonly referred to as oily waste-water. Discharge of aqueous waste steams to a POTW or direct disposal of wash solutions into waterways, must be done in compliance with environmental regulation standards. In order to meet these requirements, the waste stream generally undergoes pretreatment to reduce the contaminants (e.g., FOGs, TPHs, etc.) so discharge compliance may be accomplished. In the case of industrial laundry operations, this problem is of particular concern as large volumes of laundry waste-water are generated containing a variety of contaminants. These contaminants are removed from the soiled fabrics during the wash process and become associated with the surfactant utilized to hold the impurities in aqueous solution to form relatively stable emulsions.

Metalworking fluids are used to provide cooling and lubrication during the many cutting, grinding and forming operations that are used during processing. Metalworking formulations are complex mixtures which contain additives to perform various functions, e.g., emulsification, corrosion inhibition, lubrication, coupling, defoaming, wetting, dispersing, etc. Surfactants are primarily used in metalworking formulations as emulsifiers, wetting agents and corrosion inhibitors. In order to minimize the discharge and the need for waste treatment (cost savings), the fluids are constantly recycled for an extended time. After a period of use, however, the effectiveness of the metalworking fluids becomes significantly less due to contaminants which are introduced to the fluid from the process operations. These include such impurities as machine oil (often referred to as tramp oil), metal particles, anionic salts, cations, and other foreign matter which have collected in the metalworking fluid. These fluids are then discharged to holding tanks whereby numerous treatment technologies are employed to remove oils (some of which are recycled) and greases to allow the aqueous phase to meet the required local pretreatment ordinances (typically oil and grease concentrations of less than 100 mg/l). One of the treatment technologies involves chemical emulsion (oil/water)-breaking, whereby an emulsion-breaking agent e.g., alum or a polyelectrolyte, is added to facilitate phase separation. This process works by neutralizing electrical charges which aid in the emulsification of the oil droplets. Typically, anionic surfactants (those surfactants bearing a negatively charged ion which carries the surface active properties), e.g., soaps, petroleum sulfonates, and the like, are used in metalworking formulations due to this ability to be charge neutralized (thus destroying surfactant properties). Anionic surfactants have undesirable properties, e.g., foaming and lack of hard-water stability vis-a'-vis nonionic surfactants; however, nonionic surfactants bear no charge and are not amenable to this type of chemical emulsion-breaking.

Hard surface cleaning formulations are used to clean hard, usually smooth surfaces, e.g., metals, ceramics, etc., of process fluids, oil, dirt, debris, etc. Alkaline cleaners are commonly used for aqueous systems and surfactants are used as wetting agents and dispersants. Hard surface cleaning may be done by immersion or spraying. The surfactants should be stable to an alkaline pH and be low foaming. After several cleaning operations, the cleaning chemicals have accumulated sufficient contaminants (e.g., oils) to limit the effectiveness of the surfactant to remove them from the cleaned surfaces, e.g., metal parts, ceramic tiles, and the like, and prevent redeposition (through emulsification). Additional surfactant may be added to mitigate this problem; however, the additional surfactant increases the likelihood of undesirable foam generation, and makes waste treatment (oil/water emulsion) more difficult when the bath is discarded. Alkylphenol ethoxylates (e.g., Triton® X-100, sold by Union Carbide Corp., Danbury, Conn.) are known to be good surfactants for metal cleaning operations; however, these materials are difficult to waste-treat since they are nonionic.

Deinking formulations are used to remove printing ink from old newspapers, magazines, business paper, etc. In one of the processes, referred to as the "washing" process, the printed waste paper is fiberized in an alkaline environment, under elevated temperatures, and mechanical stirring in the presence of deinking formulations. Various washing stages are employed to obtain a thick suspension of pulp fibers that are largely free of ink. Surfactants are used in deinking processes as wetting agents to aid in dispersing the inks and binders, and as emulsifiers. Alkylphenol ethoxylates and primary and secondary fatty alcohol ethoxylates are commonly used due to low foaming and good dispersion properties. Effluent from the washing process which contains these surfactants has emulsions/dispersions (e.g., ink in water) which must be waste-treated. Additionally, recycled water streams from the process need to be treated.

The textile industry also generates several waste water effluent streams from their processes. For example, during scouring (a cleaning process) of man-made fibers, surfactants are added to remove chemical adjuncts (e.g., lubricant oil) which remain on the fiber. Surfactants are used for detergency and dispersion of the scoured-off particles. Alkylphenol ethoxylates are commonly used due to low foaming and good dispersion properties. Effluent from the washing process which contains these surfactants has emulsions (e.g., oil in water) which are difficult to waste-treat. In addition, in a dispersion dyeing process, surfactants are employed to disperse the water-insoluble dyes to ensure uniform distribution in the dye bath. When these baths must be discarded, the resultant dispersions are difficult to waste-treat.

In a process known as tertiary oil recovery, oil deposits which remain after primary and secondary oil recovery are extracted. In the chemical flooding of the deposits, chemicals are added to water to aid in the recovery. Among these are surfactants which are used to reduce the interfacial tension between the oil and the water. Thus, the surfactant (and sometimes a co-surfactant) generates an emulsion with the crude oil and the water, which allows the oil to be removed from the deposit. In a micellar flooding process the surfactant with crude oil is pumped into the oil deposit for several days to extract additional crude oil. Generally, anionic surfactants (e.g., petroleum sulfonates, ether sulfates, ether carboxylates, etc.) are employed.

The above-mentioned uses for the compounds described hereinafter in the instant invention are not intended to be exclusive, but rather to illustrate the problem and, therefore; the need for this invention for industrial, institutional, and commercial processes which generate aqueous waste streams containing FOGs, TPHs, and other water-insoluble contaminants which are emulsified due to the presence of surfactants.

One of the desirable properties of an effective surfactant is to efficiently emulsify water insoluble components. However, the separation of these components, which might now be considered impurities, and other contaminants from the aqueous effluent is complicated by the emulsifying property of the surfactant. Therefore, the stronger or more efficient the surfactant in removing and suspending hydrophobic compounds in aqueous solution, the more difficult is the later separation of the hydrophobic impurities from the water.

What is needed by businesses and industries utilizing surfactants in process streams which are eventually discharged to the environment is a highly effective surfactant which first may be utilized as a conventional surfactant to emulsify hydrophobic agents and suspend them in water, and then is capable of modification so as to permanently reduce or remove its surfactant ability and permit release, separation, and collection of the previously suspended hydrophobic constituents associated with the surfactant.

This problem has been addressed in the industrial laundry industry in part by the use of amine-based surfactants and various improved processes based on their use. These processes are generally characterized by treatment of the aqueous stream bearing the amine-based surfactant with the emulsified hydrophobic contaminants with an acid to deactivate the surfactant and release the hydrophobic contaminants, which then agglomerate and are removed, usually by a skimming or other physical separation process. Typical processes are disclosed in U.S. Pat. Nos. 5,076,937; 5,167,829; 5,207,922; and 5,374,358, among others. Amine-based surfactants have not proven to be fully satisfactory, however, since their detergency is below the best surfactants commonly used in laundry applications, e.g., nonyl phenol ethoxylates (NPE), generally considered to be the standard of the industry. Moreover, the amine-based surfactants tend to re-form and regain their surfactancy when the pH is raised, e.g., to neutralize the stream prior to discharge to a POTW which may cause problems down-stream (e.g., foaming).

SUMMARY OF THE INVENTION

It has been found by the present invention that superior end-use performance combined with desirable surfactant splittability is exhibited by certain acetal-based surfactants which within an alkaline or high pH environment act as nonionic surfactants. (As used herein, the term "acetal" is intended to refer to those compounds previously known as "ketals," such nomenclature having been abandoned by the art; see IUPAC rule C-331.1.) However, in an acidic environment these surfactants undergo, due to the presence of the acetal chemical functionality, a chemical splitting of the hydrophobe portion of the surfactant from the hydrophile portion, which destroys their surfactant properties thereby breaking down their association with the hydrophobic constituents and allowing them to more easily separate from the aqueous phase. This actual bond-breaking process, which affords a hydrophobe portion and a hydrophile portion, is hereinafter referred to as "splittable," and the acetal-derived, nonionic surfactants amenable to this chemical splitting as "splittable surfactants." Moreover, contrary to the prior art amine-based surfactants, which are generally regarded as "reversibles," the present surfactants do not re-form into surfactants when the pH is again raised to the alkaline range.

In broad terms, the instant invention provides a splittable, nonionic surfactant conforming to either of, or mixtures of, the formulas below, and a method for removing impurities associated with such surfactant in an aqueous stream, comprising:

(a) deactivating the surfactant to release the impurities from association with the surfactant by adjusting the pH of the aqueous stream to an acidic pH sufficient to split the surfactant irreversibly into a relatively water-insoluble fraction and a relatively water-soluble fraction, the released impurities and the water-insoluble fraction of the surfactant forming a relatively water-insoluble phase; and (b) removing at least a portion of the water-insoluble phase from the aqueous stream, wherein the splittable, nonionic surfactant is represented by either of, or mixtures of, the formulas:

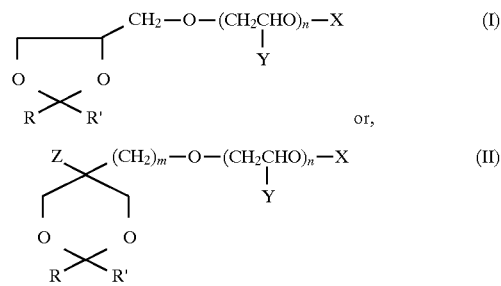

of which R and R' are the residue of an organic compound (substituted or unsubstituted) derived from a ketone of the formula

wherein R and R' may be the same or different and are residues of an organic compound (substituted or unsubstituted) which contains a total of about 8 to about 20 carbon atoms; X is hydrogen or the residue of a hydrophobic end-cap; Y is hydrogen, methyl, ethyl, or mixtures thereof; Z is hydrogen, methyl, or ethyl; m is 0 or 1; and n is an integer of 1 to about 40.

DETAILED DESCRIPTION OF THE INVENTION

This invention pertains to the purification of commercial, industrial and institutional waste water streams in order to bring them into dischargeable compliance with environmental standards. While the compositions and methods of this invention have broad applicability in the industries and uses mentioned above, the invention will be described for convenience principally in terms of its extremely effective applicability to industrial laundry processes. It will, of course, be understood by those skilled in the art that beneficial results can also be obtained in numerous other industrial applications, with formulation adjustments as and if needed.

As indicated, in a preferred embodiment, the invention provides a method for removing contaminants, such as FOGs and TPHs, e.g., from laundry waste water effluents on a batch or continuous basis. During the treatment process, the contaminants disposed within the textiles to be cleaned are treated with an alkaline detergent containing a splittable nonionic surfactant of the type described herein causing their emulsification or otherwise causing an association between the surfactant and contaminants. The surfactant is split by acidification of the waste water effluent, destroying the emulsification properties associated with the surfactant, and thus allowing the contaminants to phase-separate from the water. The FOGs, TPHs, and other contaminants are then removed from the waste water by conventional methods (e.g., skimming, chemical treatment, dissolved air flotation, etc.). The laundry waste water is then dischargeable to the POTW after a final pH adjustment that conforms the waste effluent to environmental regulations.

More particularly, this invention relates to a method for removing impurities in aqueous effluents associated with certain pH-receptive, splittable, nonionic surfactants. It is known that anionics, cationics, and amphoteric surfactants which contain charged ions can be neutralized (i.e., lose surfactant properties) by adjusting the pH of the mixture; however, this does not work for conventional nonionic surfactants, other than certain amine-based surfactants, since they do not carry a charged moiety. According to the present invention, it has been found that certain cyclic acetals having a pendant hydroxyl group can function as the hydrophobe portion of a pH-splittable surfactant. This material can be alkoxylated or otherwise modified to give a surfactant with a wide range of HLBs and having performance properties which are surprisingly superior to those exhibited by other surfactants of related chemical structure.

The surfactants useful in this invention have been broadly described in the art, particularly U.S. Pat. Nos. 3,948,953 and 3,909,460, as well as Polish Temporary Pat. Nos. 115,527 and 139,977. The present invention improves upon the teachings of the art, however, by providing optimized molecular structures and by expanding their application to diverse end-uses for which such surfactants have heretofore been unknown. In the area of laundry, especially industrial laundry, surfactants of this invention offer the surprising advantages of cleaning performance equivalent to that of NPE, and significant reduction of environmentally problematical materials such as phosphate builders, as will be described more fully below. In other end-uses, the surfactants of this invention offer the surprising advantages of good oil/water emulsification, metal cleaning, low foaming, and waste treatability of metalworking formulations.

The pH-receptive, splittable, nonionic surfactants useful in this invention comprise acetal-based surfactants derived from condensation of a ketone with a polyol followed by alkoxylation. Specifically, the surfactants of this invention are represented by either of, or mixtures of, the formulas:

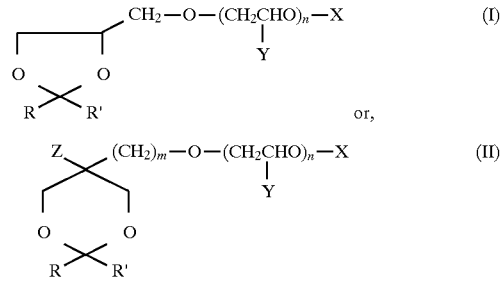

of which R and R' are the residue of an organic compound (substituted or unsubstituted) derived from a ketone of the formula

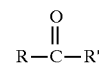

wherein R and R' may be the same or different, and are residues of an organic compound (substituted or unsubstituted) which contains a total of 8 to 20 carbon atoms, preferably 10 to 18 carbon atoms, more preferably 12 to 18 carbon atoms, and most preferably 12 to 15 carbon atoms; X is hydrogen, or the residue of a hydrophobic end-cap, e.g., $CH_2Ph$, tert-butyl; Y is hydrogen, methyl, ethyl, or mixtures thereof; Z is hydrogen, methyl, or ethyl; m is 0 or 1; and, n is an integer of at least 1, preferably 1 to about 40, more preferably 2 to about 12, most preferably 3 to about 9. As used herein, the phrase "residue of an organic compound" is contemplated to include all permissible residues of organic compounds. (By the term "permissible" is meant all residues, moieties, etc., which do not significantly interfere with the performance of the surfactant for its intended purposes.) In a broad aspect, the permissible residues include acyclic and cyclic, branched and unbranched, carbocyclic and heterocyclic, aromatic and nonaromatic residues of organic compounds. Illustrative organic compound residues include, for example, alkyl, aryl, cycloalkyl, heterocycloalkyl, alkyl(oxyalkylene), aryl(oxyalkylene), cycloalkyl(oxyalkylene), heterocycloalkyl(oxyalkylene), hydroxy(alkyleneoxy), and the like. The permissible residues can be substituted or unsubstituted and the same or different for appropriate organic compounds. This invention is not intended to be limited in any manner by the permissible residues of organic compounds.

As used herein, the term "substituted" is contemplated to include all permissible substituents of organic compounds. In a broad aspect, the permissible substituents include acyclic and cyclic, branched and unbranched, carbocyclic and heterocyclic, aromatic and nonaromatic substituents of organic compounds. Illustrative substituents include, for example, alkyl, alkyloxy, aryl, aryloxy, hydroxy, hydroxyalkyl, halogen, and the like, in which the number of carbons can range from 1 to about 20 or more, preferably from 1 to about 12. The permissible substituents can be one or more and the same or different for appropriate organic compounds. This invention is not intended to be limited in any manner by the permissible substituents of organic compounds. It is understood by one skilled in the art that structures (I) and (II) above represent polyoxyalkylene derivatives of the acetal, and may be composed of mixtures of ethoxylates, propoxylates, or butoxylates produced in either a random or block mode process. The acetal (or mixture of acetals) will preferably have a (an average) molecular weight of at least about 260. While there is no specific known limit on the molecular weight of the ketone, as the number of carbon atoms in the ketone exceeds about 12–14, the resulting surfactant becomes more paraffin-like in nature. Although this could result in better phase separation, such ketones are not readily available (in commercial quantities) because of the difficulty of manufacturing and purifying them.

The splittable, nonionic surfactants of the formula above can be prepared by conventional methods known in the art. (See, e.g., U.S. Pat. No. 3,948,953 and its CIP 3,909,460, as well as Polish Temporary Pat. Nos. 115,527 and 139,977, which refer to the pH-splittability of such compounds.) For example, the surfactants of the formulas may be prepared using polyol starting materials containing at least three hydroxyl groups, two of which form a cyclic 1,3-dioxane or 1,3-dioxolane functionality, by treating a polyol with a suitable ketone. Examples of such polyols include, for example, glycerol, 2-ethyl-2-(hydroxymethyl)-1,3-propanediol (trimethylolpropane), 1,1,1-tris (hydroxymethyl)-ethane (trimethylolethane), sorbitol and mannitol among others. Glycerol and trimethylolpropane are preferred. Examples of suitable ketones include 2-octanone, 2-nonanone, 3-nonanone, 5-nonanone, 4,6-dimethyl-2-heptanone, 2-decanone, 3-decanone, 4-tert-butylcyclohexanone, 2-methyl-4-nonanone, 2-undecanone, 6-undecanone, 2-dodecanone, 4-dodecanone, and 2-tridecanone. Of these, 2-octanone, 2-decanone and 2-dodecanone are preferred. Most preferred is a series of isomers derived from liquid-phase normal paraffin oxidation followed by dehydrogenation of the resultant alcohols to afford an isomeric mixture of $C_{12}$ to $C_{14}$ ketones. This material is available from Nippon Shokubai Co. Ltd., Tokyo, Japan.

The first step in the synthesis of the splittable surfactants of this invention is to form the acetal moiety by treating the polyol with the ketone under suitable reaction conditions, usually at atmospheric pressure and a temperature of from about 40° C. to about 175° C. in the presence of an acid catalyst, such as sulfuric or toluenesulfonic acid in an amount of from about 0.01 to about 10, preferably about 0.01 to about 0.5, weight percent based on the total charge, with removal of water formed from the condensation reaction. It has been found that phosphoric acid is also desirable since, although somewhat slower in reaction rate, it produces a somewhat lighter, more desirable color in the product. The ketone is mixed with about a 1.1 to 1.3 molar excess of the polyol. Heptane is added as a solvent to aid in the azeotropic removal of water from the system. The five-membered ring (1,3-dioxolane) is formed preferentially.

The resulting acetal containing at least one free hydroxyl group is suitable for the alkoxylation reaction, normally conducted under basic conditions, which involves reaction of the acetal with a suitable alkylene oxide such as ethylene oxide, propylene oxide, butylene oxide or mixtures thereof. Conventional reaction conditions may be employed, e.g., temperatures of from about 80° C. to 150° C. and modestly elevated pressures. Suitable basic catalysts include tertiary amines, sodium hydroxide, potassium hydroxide and the corresponding metals, hydrides and alkoxides. The resultant acetal-based alkoxylation reaction products are represented by formulas (I) and (II), above. Typically from about 1 to about 100 moles, preferably from 1 to about 40 moles of alkylene oxide per mole of acetal may be employed.

The splittable, nonionic surfactants of this invention have a broad distribution of alkoxylation species which is expected from a base-catalyzed alkoxylation process. See, for example, M. J. Schick, *Nonionic Surfactants*, Volume I, Marcel Dekker, Inc., New York, N.Y. (1967) pp. 28 to 41. The splittable, nonionic surfactants of this invention may be produced to have a narrow, but balanced, distribution of alkoxylation species by employing narrow molecular weight catalysts (e.g., calcium-based) which have been disclosed in the art (e.g., U.S. Pat. Nos. 4,754,075; 4,820,673; and 4,886,917). These catalysts produce surfactants which can be relatively free from large amounts of substantially higher alkoxylation moieties, i.e., those having at least three more alkoxyl groups than the average peak alkoxylate species. Advantageously, these narrow distributions can be obtained where the most prevalent alkoxylation moiety has four or greater alkoxy units, that is, in the regions in which conventional catalysts provide a relatively wide range of alkoxylation species. It is common for one skilled in the art to tailor-manufacture an alkoxylate to enhance the end-use performance. The benefit of the narrow molecular weight products can be determined by evaluation under a given process vis-a'-vis the more conventional distribution obtained under typical (e.g., potassium hydroxide) base-catalyzed alkoxylations. The moles of alkylene oxide added to the acetal starter will depend on various factors associated with the end-use application, e.g., the desired hydrophile-lipophile balance (HLB) for emulsification, cloud point, etc. No one alkoxylate is preferred for all applications, and within a given application a blend of a low mole (e.g., 3-mole) and a high mole (e.g., 9-mole) alkoxylate may be preferred vis-a'-vis a single product (e.g., 6-mole alkoxylate). In addition, ethylene oxide/propylene oxide/ butylene oxide mixtures, whether random or block addition, may show advantages in certain applications as compared to a material in which only ethylene oxide has been added.

As is well known in detergent formulation art, particularly in laundry applications, surfactants are typically combined with one or more "builders." Such materials are added to the composition for various reasons, including, e.g., sequestering water hardness ions, facilitating the removal and suspension of soils and blocking redeposition, maintaining pH in the basic range, and the like. Among the commonly used inorganic builders are phosphates (e.g., sodium tripolyphosphate), typically used in concentrations of about 5 to about 30 wt. percent, silicates and metasilicates, typically used in concentrations of about 5 to about 40 wt. percent, sodium carbonate and bicarbonate, typically used in concentrations of about 0 to about 40 wt. percent caustic, typically used in concentrations of about 0 to about 10 wt. percent, zeolites, and the like. Among the commonly used organic builders are carboxymethyl cellulose (CMC), polyvinyl-pyrrolidone (PVP), ethylenediaminetetraacetic acid (EDTA), citric acid, and the like. Such materials are necessary and are commonly used with conventional nonionic surfactants such as nonylphenol ethoxylates, primary and secondary alcohol ethoxylates, and the like. There has been significant pressure on detergent manufacturers to find a replacement for phosphates in detergent compositions due to environmental concerns. To date, this has met with only limited success (e.g., nitriloacetic acid as a phosphate substitute in household powders) since phosphates not only soften water but have other properties (e.g., deflocculate and suspend insoluble materials, emulsify oils, etc.) which aid in the cleaning and removal of impurities from the soiled fabrics. It would be desirable to identify a component in the detergent composition which would minimize or eliminate the need for phosphates. It is a surprising feature of the present composition that phosphate builders can be largely or completely avoided with little or no effect on cleaning performance. Preferably, phosphate content may be limited to no more than about 10%, more preferably 0 to about 5%, by weight of the total dry detergent formulation. If it is desired to include one or more builders in the formulation, normal concentrations of silicates or metasilicates are preferred.

Since a principal purpose of the invention is to permit coalescence or agglomeration of the FOGs into readily removable form, it is desirable to avoid the use of effective concentrations of materials which impede coalescence, e.g., redeposition aids, such as phosphates, polyacrylates, and CMC. Dispersing aids in general should be used sparingly, and preferably avoided, to maximize the phase separation which occurs after the surfactants of the instant invention are split.

As mentioned previously, metalworking fluids are used principally to aid in the cutting, grinding or forming of metal, to provide a quality finish to the workpiece while minimizing wear of the machine tools. These fluids provide cooling and lubrication of the metal/tool interface while aiding in the removal of metal fines and chips from the piece being formed. The evolution of metalworking fluids has gone from simple oils to complex systems based on the emulsification of oils in water. To those skilled in the art, the water-based technology types of metalworking fluids are generally classified as soluble oils, semisynthetic fluids, or synthetic fluids. Each type of fluid offers different benefits for metalworking. For example, soluble oils, which are fluids with a high oil content, provide better lubricity vis-a'-vis synthetic fluids. Conversely, synthetic fluids, which are generally water-soluble and contain no mineral oils, offer better cooling, hard water stability, and resistance to microbiological degradation vis-a'-vis soluble oils. The third type of metalworking fluid, the semisynthetics, was developed to take advantage of the benefits of both soluble and synthetic oils. These semisynthetics are water-based fluids containing some oil-based components emulsified into water to form a microemulsion system. Thus, it follows that semisynthetic and synthetic metalworking fluids would be more difficult to waste-treat than the soluble oils.

As is well known to one skilled in the art, surfactants are combined with one or more chemical additives in order to formulate a metalworking fluid which can serve a multitude of functions. These functions includes such things as corrosion inhibition, lubrication, defoaming, pH buffering, dispersing and wetting. These chemical additives include chemical functionalities such as fatty acids, fatty alkanolamides, esters, sulfonates, soaps, chlorinated paraffins, sulfurized fats and oils, glycol esters, ethanolamines, polyalkylene glycols, sulfated oils, and fatty oils. Such additives are necessary and are commonly used with conventional anionic and nonionic surfactants. Metalworking formulations which use anionic surfactants are relatively easy to waste-treat since these materials are amenable to treatment by acidification or reaction with cationic coagulants. However, metalworking fluid formulations which contain conventional nonionic surfactants are much more difficult to waste-treat since they are not amenable to these types of chemical treatment. See, for example, J. C. Childers, *Metalworking Fluids*, edited by J. P. Byers, Marcel Dekker Inc., New York, N.Y. (1994), pp. 185, 367–393. As a result, when using nonionic surfactants (e.g., a nonylphenol ethoxylate) as emulsifiers for metalworking fluids, formulations are designed to allow for waste water treatment. In fact, numerous metalworking fluid formulations which use conventional nonionic surfactants are designed first and foremost to be waste-treatable after use. This emphasis on waste treatment results in metalworking fluids which may not provide the best possible end-use performance, such as corrosion inhibition, lubrication, dispersion or wetting. Despite their difficulty to waste-treat, conventional nonionic surfactants are still used in metalworking formulations since nonionics offer distinct advantages (e.g., hard water stability, "tighter" emulsions, variety of HLBs, low foaming, etc.) over anionic surfactants. The splittable, nonionic surfactants described herein provide good emulsification and wetting for soluble oils, semisynthetics, and synthetics, while providing the added benefit of easier waste-water treatment. Further, with splittable, nonionic surfactants, improved metalworking formulations can be developed which provide better end-use performance vis-a'-vis metalworking fluids which are designed to be waste-treatable. It is an unexpected benefit of this invention that other additives may be incorporated in the metalworking fluid formulation when a splittable, nonionic surfactant is used as the emulsifier. For example, a metalworking formulation which contains a conventional nonionic surfactant might not include a fatty acid (e.g., neodecanoic acid), since as soaps (a neutralized fatty acid) these materials can act as emulsifiers and cause problems with waste-water treatment. Conversely, with the use of splittable, nonionic surfactants of the instant invention, fatty acids may be added to the metalworking formulation to provide boundary lubricity while still maintaining a metalworking fluid which can be waste-treated by conventional methods. The instant invention provides a method to waste-treat not only soluble oils and semisynthetic oils, but also synthetic fluids. Much new product development deals with synthetic water-insoluble lubricants which use multiple emulsifiers to provide a waste-treatable system with no petroleum oil in the formulation. The splittable, nonionic surfactants of the instant invention may function as the primary emulsifier or as an additional emulsifier while still providing waste-treatability to the formulation.

Metal-cleaning fluids are used in a variety of metal-forming and coating processes, and are used to clean metal surfaces of process fluids, oil, dirt, debris, etc. There has been a growing trend toward the development of aqueous-based cleaning systems, as a number of widely used organic solvents, such as methyl chloroform, trichloroethylene, methylene chloride, etc., are in various stages of being banned from the workplace. Aqueous alkaline cleaners, therefore, are increasing in their use, and formulations are being developed to maximize their usefulness. Conventional nonionic surfactants (e.g., Triton® X-100) are commonly used as wetting agents, dispersants and emulsifiers.

A problem typically encountered with metal-cleaning solutions is the accumulation of oils in the cleaning bath. As the oils increase in the cleaning bath, it becomes more difficult for the surfactant to emulsify the oil. More surfactant may be added to the bath to remedy this problem; however, problems of foaming and waste-water treatment of the effluent become more pronounced because of the higher amount of surfactant present. It would be desirable to have a surfactant which provides cleaning, low foaming, and waste-treatability. The prior art U.S. Pat. No. 5,114,607 discloses the use of an ethylene oxide-propylene oxide block copolymer surfactant and a defoaming reverse ethylene oxide-propylene oxide block copolymer surfactant as a surfactant in an alkaline formulation which provides good metal-cleaning, low foaming, and waste-treatability. In addition, a hydrotrope must be added to maintain the suspension. After cleaning, the hydrotrope is neutralized with acid, which allows for phase separation. This technology may be viewed as similar to the aforementioned reversible surfactants. The nonionic, splittable surfactants of the instant invention provide low foaming, cleaning, and waste treatability which hitherto was unavailable with the conventional nonionic surfactants. An additional defoamer may be minimized by the addition of propylene oxide, or other hydrophobic moieties (e.g., tert-butyl, benzyl, methyl, etc.) to the parent surfactant. Waste-water treatment can be accomplished as detailed above. Again, suspension agents (e.g., phosphates) should be minimized in the cleaning formulation to favor phase separation.

Similar results may be obtained in other applications, whereby FOGs, TPHs and other water-insoluble contaminants are emulsified in waste-water effluents by the presence of surfactants. With the use of the nonionic splittable surfactants of the instant invention, the pH of the waste-water effluent may be lowered (2 about pH 6) to initiate the hydrolysis of the acetal which results in the release of a hydrophobe portion and a hydrophile portion, thus resulting in a loss of surface-active properties. The net result is a phase separation of oil and water. The nonionic, splittable surfactants of the instant invention are compatible with other waste-water treatment methods, including primary-stage treatments (e.g., gravity separation) and secondary-stage treatments. The invention described herein, may add significant value to secondary-stage treatments including membrane (e.g., ultrafiltration systems which are often fouled by impurities resulting in significant process down-time), centrifugation, and a dissolved air flotation (DAF) unit. The net result is greater throughput and minimal usage of expensive waste treatment chemicals.

In accordance with the method of this invention, the acetal-derived, splittable, nonionic surfactant is split in an aqueous solution to release impurities from association with the surfactant by adjusting the pH of the solution to an acidic pH sufficient to cause the acetal functionality to chemically break (rupture of two carbon-oxygen bonds) resulting in a hydrophilic fragment and a hydrophobic fragment. Since in most processes this bond breaking is done in an aqueous environment, this splitting process may also be referred to as an acetal hydrolysis. The pH can be adjusted by conventional procedures using conventional acids. Suitable acids include, for example, sulfuric acid, hydrochloric acid, acetic acid, hydrofluoric acid, nitric acids, etc. Preferably, the pH of the adjusted solution is from about pH 3 to about pH 6. The amount of acid to be added is an amount sufficient to cause splitting of the surfactant, and is dependent upon the volume and composition of the solution. The splittable nonionic surfactants may also be split with well-known solid heterogeneous acids (e.g., Nafion®, silica gel, Amberlyst® 15, mixed metal oxides, etc.). The use of solid heterogeneous acids is especially useful in fixed-bed treatments.

The catalyzed hydrolysis of acetals has been extensively studied in the art. For example, T. H. Fife, *Accounts of Chemical Research*, Volume 5 (1972), pp. 264–272; and, E. H. Cordes and H. G. Bull, *Chemical Reviews*, Volume 74(1974) pp. 581–603. From these, it is apparent that the rate and reaction conditions necessary to cause carbon-oxygen bond rupture of the acetal are complex. While not wishing to be bound by theory, the splittable, nonionic surfactants of the instant invention may be split over a wide range of pressures ranging from atmospheric or subatmospheric pressures to superatmospheric pressures, preferably atmospheric pressure.

In addition, the temperature of the deactivation may be as low as about ambient temperature to about 100° C. Generally, temperatures above ambient result in shorter times for splitting of the surfactant, but in processes whereby temperatures above ambient are not preferred (e.g., for economic reasons), the splittable, nonionic surfactant will still hydrolyze. Temperatures of about 40°–80° C. are generally preferred.

Chemical components in the waste-water effluent in combination with the splittable, nonionic surfactants can produce what are hereinafter referred to as "matrix effects." These matrix effects may inhibit the ready hydrolysis of the acetal moiety and/or interfere with the phase separation of the treated effluent. It is expected that the hydrolytic reactivities of the splittable, nonionic surfactants will be less in a complex matrix composed of numerous chemical components vis-a'-vis the splittable, nonionic surfactant in water. Conversely, some chemical components (e.g., silicates) in the matrix may actually aid in the hydrolysis of the splittable, nonionic surfactants, and/or the phase separation of the treated effluent.

Treatment of the waste water effluent to split the splittable, nonionic surfactant and ultimately cause phase separation is conducted for a minimum period of time sufficient to cause hydrolysis or splitting of the surfactant, followed by partial phase separation of the organic and aqueous components, which hitherto were emulsified. The exact reaction time employed is dependent, in part, upon factors such as temperature, matrix effects, degree of agitation, and the like. The reaction time will normally be within the range of from about one-half to about 10 hours or more, and, preferably, from less than about one to about 5 hours.

The splittable, nonionic surfactant is split into a relatively water-insoluble fraction (hydrophobic) and a relatively water-soluble (hydrophilic) fraction. The water-insoluble fraction comprises the starting ketone and the water-soluble fraction comprises an alkoxylated polyol. Neither fraction produced from the hydrolysis is surface-active, so the FOGs and TPHs are released from association, e.g., emulsion, with the surfactant. The FOGs, TPHs and the hydrophobic fraction of the surfactant form a relatively water-insoluble phase in the aqueous stream. At least a portion of this phase in the spent aqueous stream is recovered by conventional methods such as filtration, skimming, and the like. Preferably, a substantial portion of the water-insoluble phase is recovered, e.g., the spent aqueous stream has less than 100 parts per million FOG. The recovered water-insoluble phase can be disposed of, for example, in a landfill or by burning in a furnace, or may undergo oil reclamation processes. The remaining aqueous stream can be discharged to a POTW after a final pH adjustment to a relatively non-acidic pH that conforms the waste effluent to environmental regulations, or in some cases be recycled for further use. Recycle is especially attractive if the aqueous stream is further treated with a membrane system to remove any water-soluble organics, including the water-soluble alkoxylated polyol which is present after the splittable, nonionic surfactant is hydrolyzed. It is another advantage that the splittable, nonionic surfactants of the instant invention may be used in conjunction with membrane systems to provide essentially organic-free aqueous effluent. By pretreating the aqueous effluent containing the compounds of the instant invention according to the methods described hereinabove, an aqueous phase is obtained which contains considerably less FOGs and TPHs which can contribute to fouling of membranes. This results in longer membrane life and less downtime during waste-water treatment.

The nonylphenol ethoxylates known under the surfactant trade names as Tergitol® NP-4, Tergitol® NP-6, and Tergitol® NP-9 are 4-mole, 6-mole, and 9-mole ethoxylates, respectively. The octylphenol ethoxylate known under the surfactant trade name of Triton® X-100 is a 10-mole ethoxylate. The amine ethoxylate known under the surfactant trade name Triton® RW-75 is a 7.5-mole ethoxylate. The secondary alcohol ethoxylate known under the surfactant trade name as Tergitol® 15-S-9 is a 9-mole ethoxylate. The primary alcohol ethoxylate known under the surfactant trade name as Neodol® 25-9 is a 9-mole ethoxylate.

It will also be recognized by those skilled in the art that the compositions and methods of this invention are not limited to the particular uses discussed above. For example, it may be expeditious in particular instances to treat an internal process stream with a surfactant of this invention, effect the separation of susceptible materials by a method of this invention, then recycle the remainder of the stream to the process. In another variation, a stream bearing materials emulsified by a surfactant not of this invention could be treated with a surfactant of this invention to replace in whole or in part such other surfactant, followed by effecting a separation method of this invention, and returning the other surfactant to the process as by a recycle. Similarly, it will be recognized that a method of this invention need not result in complete deactivation of the surfactant; for example, sufficient deactivation could be employed to reduce contaminants to an acceptable level and the treated stream returned to the process until the contaminant level builds up to the point where additional treatment is required. Obviously, such a technique could be applied on either a continuous or batch basis.

In another useful embodiment, a surfactant of this invention can be used in a method to co-emulsify in an aqueous stream an existing emulsion of hydrophobic materials with unemulsified hydrophobic materials also in such stream, and thereafter splitting the resulting co-emulsified materials by reducing the pH of the stream, according to the method previously described.

EXAMPLES

The invention is illustrated by, but in no way limited by, the following examples.

Table 1

General Procedure for the preparation of acetals via the condensation of ketones with polyols (Examples A–N)

To a multi-neck, round-bottom flask equipped with a condenser, Dean-Stark trap and heating mantle were added ketone, polyol, heptane, and p-tolunesulfonic acid monohydrate. The flask was purged and evacuated three times with nitrogen and the mixture heated to reflux, with concurrent removal of the heptane/water azeotrope until such time as no additional water was obtained overhead in the Dean-Stark trap. The reaction mixture was cooled and placed in a separatory funnel to remove unreacted polyol (in the case of glycerol) which separated from the reaction mixture as the bottom layer. Products were refined on a rotary evaporator under vacuum. In some cases, prior to refining the material, additional heptane was added to the reaction mixture and it was extracted (using a separatory funnel) 3 times with a 10 percent by weight sodium carbonate/water solution to remove additional polyol and neutralize the catalyst. The aqueous solution (bottom layer) was discarded, and the organic solution was refined as described hereinabove. Additional refining was required in some cases to give acceptable purities ($^3$ 97 percent purity) of the acetal. The acetals were analyzed by capillary gas chromatography (FID) using a 30 meter, 0.25 mm ID, 0.1 micron film thickness, DB5HT column.

Procedure for the condensation of $C_{12}$–$C_{14}$ mixed ketones with glycerin (Example O)

To a 3-liter, four-neck round-bottom flask equipped with a condenser, Dean-Stark trap and heating mantle were added 793.7 grams (ca. 4 mole) of higher ketone (from Nippon Shokubai), 443.2 grams (4.8 mole) of glycerin, 500 ml of heptane, and 0.3 gram of p-toluenesulfonic acid monohydrate. The flask was purged and evacuated three times with nitrogen and the mixture heated to reflux (initial kettle temperature of 131° C.). The reaction mixture was heated at reflux for 16 hours, during which time a total of 70.1 grams of water was obtained overhead in the Dean-Stark trap. The reaction mixture was cooled and placed in a separatory funnel; whereby, 87.2 grams of glycerol separated from the reaction mixture and was removed. An additional ca. 500 ml of heptane were added to the reaction mixture and it was extracted 3 times with a 10 percent by weight sodium carbonate/water solution. The aqueous solution was discarded, and the organic solution was further refined on a rotary evaporator under vacuum. The product was collected at 196° C. (3 mm Hg) to afford 743.9 grams (68.3 percent yield) of product.

General procedure for the alkoxylation of acetals (Examples A–O) to produce acetal-derived surfactants The general procedure to produce the base-catalyzed starter was as follows. The acetal was charged to the reactor or to a round-bottom flask equipped with a water condenser. The catalyst (typically sodium hydroxide or potassium hydroxide at 0.05–5.0 wt. percent) was added to the acetal and the mixture was heated at 140° C. under vacuum (10–50 mm/Hg) for one hour while removing water overhead. After this time the kettle product was suitable for alkoxylation as described below.

The procedure described herein was used to produce the splittable, nonionic surfactants described in the instant invention. The reactor for these preparations was a 2-gallon, stirred autoclave equipped with an automatic ethylene oxide (or other alkylene oxide) feed system wherein a motor valve controlled the feed of ethylene oxide to maintain about 60 psig pressure. Into the 2-gallon, stirred autoclave were added the acetal starter (examples A–O), ethylene oxide and a catalyst (either performed as described hereinabove, or generated in situ by heating the contents and removing the water from the system). Ethoxylations were conducted under a nitrogen atmosphere (20 psig) at a temperature of 140° C. Propoxylations were done at a temperature of 110°–115° C. The ethoxylation was continued until a desired mole ethoxylate (or mixed alkoxylate) was obtained, after which the oxide feed was discontinued and the contents were allowed to "cook out" (maintain a constant reactor pressure). An aliquot was discharged through the dump valve, allowed to cool, and partly neutralized with acid (e.g., acetic, phosphoric, etc.), being certain to maintain an alkaline pH. The ethoxylation was continued on the remaining material in the autoclave by continuing the addition of ethylene oxide until the next mole ethoxylate was obtained. This procedure was continued until a product series was obtained (usually a 3-, 6-, 9-, and 12-mole ethoxylate).

Testing and Evaluation Procedures

In order to determine the laundry cleaning efficacy of the nonionic, splittable surfactants of the instant invention, standardized procedures were run using a Terg-O-Tometer and laundry standard surfactants to aid in the evaluation. The Terg-O-Tometer testing allows for a preliminary screening of surfactant detergency, and can provide direction for further development.

A Model 7243 S Terg-O-Tometer obtained from Research and Testing Co., Inc., Hoboken, N.J. was used to determine laundry cleaning performance of the nonionic, splittable surfactants describe herein. Each of the six buckets was charged with 1000 mL of distilled water, 2.5 grams of surfactant, and sodium hydroxide solution to give a pH of 10.7 to 11.0. Four standard soiled cloths containing the same amount of dirty motor oil soil were added to the bucket. Four clean swatches were also added for bulking purposes and to provide a qualitative evaluation for redeposition. The test swatches were obtained from Testfabrics, Inc., Middlesex, N.J., and Scientific Services S/D, Inc., Sparrow Bush, N.Y. The cloths were laundered for one ten-minute wash step, after which the cloths were removed from the buckets and the buckets rinsed with distilled water. The cloths were returned to the bucket with 1000 mL of distilled water, and one two-minute rinse step was conducted. Wash and rinse temperatures were both 145° F. and the Terg-O-Tometer operating speed was 100 rpm. Wash and rinse water were preheated to the appropriate temperature before charging to the bucket. The cloths were dried in a standard household design clothes dryer and evaluated for cleaning performance. A BYK-Gardner TCS Spectrophotometer was used to obtain the reflectance of the soiled cloths before and after laundering. The percent detergency was calculated using the equation:

$$\% \text{ Detergency} = [(A-B) \div (C-B)] \times 100$$

where A=Reflectance of the soiled test cloth after laundering

B=Reflectance of the soiled test cloth before laundering

C=Reflectance of the test cloth before soiling.

The results are provided in Table A. Test cloths change from lot to lot due to differences in soiling and the condition and texture of the fabric. Examples 1–9 in Table A were evaluated on the same lot of cloth. Examples 10–14 were run on different lots. Under these circumstances, it is best to compare the results against a standard (e.g., Tergitol® NP-9) under the same conditions. As the results show, splittable nonionic surfactants derived from lower(<11 carbon atoms) molecular weight, unbranched acyclic ketones (examples 1–5) showed peak cleaning performance for a 3-mole ethylene oxide product. For those splittable, nonionic surfactants derived from higher ($\geq$ 11 carbon atoms) molecular weight unbranched acyclic ketones (examples 6–8), the peak cleaning performance was observed for the 6-mole ethylene oxide adduct. Splittable, nonionic surfactants derived from branched or cyclic ketones (examples 9, 13, and 14) gave different results from those mentioned above, and in the case of examples 9 and 14, cleaning performance was not as good as the standard (Tergitol® NP-9). In many cases, cleaning performance may be enhanced by blending within a given "family" of surfactants, i.e., blending a low-mole (e.g., 3-mole) ethoxylate with a high-mole (e.g., 9-mole) ethoxylate.

To determine the effect of various and sundry inorganic and organic builders on the treatability of the waste-water effluent (matrix effects) of the nonionic, splittable surfactants, compositions containing 15–25 weight percent of a splittable, nonionic surfactant and 75–85 weight percent builder were prepared. Ten grams of built detergent were added to the Terg-o-Tometer bucket (pH ranged from 9.5 to 11.5, depending on the choice and amount of builders ) and evaluated using the procedure described hereinabove. The waste-water effluent was collected by combining the wash and rinse waters from the standard Terg-o-Tometer test procedure for each bucket, and filtering each through a 35 mesh screen (to remove the larger lint) into a ½ gallon jar. Each composite was maintained at the wash and rinse temperature (145°) in a constant temperature bath until time for treatment. Each composited waste was well agitated then approximately 800 to 900 mL were poured into each of two 1 liter beakers. The beakers were modified with a 4 mm Teflon-barrel stopcock located 1½ to 2 inches from the bottom for the purpose of withdrawing a water sample as a side stream free of contamination from floating oil and floc or settled sludge. The beakers were custom-fabricated by Lab Glass, Inc. Kingsport, Tenn. The waste-water in one of the beakers was left unchanged (Untreated Sample). The pH of the waste-water in the other beaker (Treated Sample) was lowered to 3 or 5 using an aqueous sulfuric acid solution. Both beakers were maintained at the wash and rinse temperature (145° F.) in a constant temperature bath for 30 to 90 minutes. The beakers were removed from the bath and allowed to sit undisturbed for 20 to 30 minutes. Water samples (approximately 5 mL) were taken from each beaker through the stopcock after first gently purging out and discarding approximately 10 to 15 mL to remove contamination from the side arms of the stopcock. The water samples were then analyzed for Chemical Oxygen Demand (COD) which was determined under limited and controlled conditions described in *Standard Methods For The Examination of Water and Wastewater*, 18th Edition (1992), procedure No. 5220 D. As the results show (Table B) when high levels of phosphate (example 1) are in the detergent formulation, the phase separation of organics (e.g., FOGs, TPHs, etc.) and water is not good (as evidenced by the high COD numbers), thereby not allowing for the full benefit of the instant invention for phase separation of the organics and water. However, when phosphate is absent from the formulation (examples 2–6), good phase separation was observed after the splittable, nonionic surfactant is split by lowering the pH to $\geq$ 5. Additionally, moderate levels of sodium metasilicate and the presence of a silica component (e.g., Sipernat 50 available from North America Silica Company, Valley Forge, Pa.) aided in the phase separation (examples 2, 3, 5, and 6). A conventional nonionic surfactant (e.g., Tergitol® NP-9) does not split under these conditions; therefore, no phase separation was observed.

The effect of phosphate concentration on cleaning performance of the nonionic, splittable surfactants compared to conventional nonionic surfactants is provided in Table C. As the results show, good detergency was obtained when phosphate was in the formulation for the splittable, nonionic surfactant (example 1) and the conventional nonionic surfactant (example 4). Unexpectedly, good detergency was maintained for formulations without phosphate when a splittable, nonionic surfactant was used (examples 2 and 3), vis-a'-vis poor detergency when phosphate was absent in the formulations for a conventional nonionic surfactant (examples 5 and 6).

Comparative examples of the surfactants of the instant invention with those disclosed in U.S. Pat. Nos. 3,909,460 and 3,948,953 are provided in Table D. The evaluation was done using the test procedures described, and comparing the surfactants of the instant invention with the standards disclosed. The wash and rinse steps were conducted using 3000 ppm hard water (Ca:Mg ratio=3:2) prepared by dissolving 79.29 grams of calcium chloride dihydrate ($CaCl_2.2H_2O$) in 2000 mL of distilled water, and mixing this with 88.74 grams of magnesium sulfate heptahydrate ($MgSO_4 \cdot 7H_2O$) dissolved in 2000 mL of distilled water. The mixture was diluted to a total of 30 liters using distilled water. As the results show, good detergency was obtained for the higher molecular weight ketone-derived products (examples 1 and 3), whereas somewhat less percent detergency was obtained for those splittable, nonionic surfactants derived from lower molecular weight ketones (examples 2 and 4) which are disclosed in the above-mentioned U.S. Patents. A similar result was obtained when a builder was used in a formulation to determine detergency as described in U.S. Pat. No. 3,909,460. These results show that splittable, nonionic surfactants derived from higher molecular weight ketones ($\geq$ 12 carbons) are preferred products for detergency vis-a'-vis those materials prepared from lower molecular weight ketones (<12 carbons). In addition, it is preferred that the ketones are acyclic, and minimally branched, such as those obtained from normal paraffin liquid-phase oxidation with concurrent dehydrogenation of the resultant alcohols to provide ketones.

In order to determine the efficacy of the nonionic, splittable surfactants for metalworking fluid formulations, emulsification studies, standard foam tests, and waste-treatability data was collected.

Emulsification tests were run simulating a soluble oil formulation. To a mixture of 16 grams of naphthenic oil (Ergon Hygold V-200) and 4 grams of surfactant were added 25 grams of water. Observations were made after standing at room temperature for 1 hour and 24 hours. The results are given in Table E. As the results show, some of the splittable, nonionic surfactants of the instant invention afford emulsification properties similar to Tergitol® NP-6 and Tergitol® NP-9.

The relative foaming properties of the nonionic, splittable surfactants were determined under limited and controlled conditions described in ASTM procedure No. D1173 and are reported in Table F. As the results show, the nonionic, splittable surfactants of the instant invention show significantly less foam after 5 minutes compared to the standard Tergitol® NP-9 (example 18). Also, as the degree of carbon branching increases (i.e. for products derived from linear acyclic ketones) for a common molecular weight, the foam height decreases (compare experiments 2, 3 and 4). Capping of the parent molecule with propylene oxide further diminishes the foam (experiments 15, 16, and 17). As expected, when the foam tests are run near the cloud point temperature of the products (experiments 19, 20, and 21), the foam is greatly diminished.

The waste-treatment of the nonionic, splittable surfactants was compared to conventional nonionic surfactants in metalworking formulations by treating a mixture containing metalworking fluid components using the following method:

The mixture to be tested was diluted to 0.5 wt. percent and stored for at least 24 hours at room temperature. After this time, the pH of 0.5 wt. percent solution was lowered to a pH of 3–5 with 2.5 wt. percent aqueous sulfuric acid. This acidic solution was then heated to 50°–60° C. for 2–3 hours. After allowing the solution to cool to room temperature, it was adjusted to pH 6–9 with 2.5 wt. percent aqueous sodium hydroxide. Up to six 600-mL beakers were filled with 250 mL of the test solution. The mixture was stirred at 95–100 rpm for 5–6 minutes on a Phipps & Bird six-paddle stirrer with illuminated base. Cationic polymer (WT 2545 from Calgon Corp., Pittsburgh, Pa.) was added in increments of 50–100 ppm up to a maximum of 1200 ppm while mixing at 95–100 rpm for at least five minutes. After this time, 300 ppm of aluminum sulfate solution were added to the mixture and mixing continued for at least five minutes. After the required mixing time, the mixing speed was increased to 150 rpm. Five ppm of anionic polymer (DOL E-Z-2706 from Calgon Corp.) were added and then the solution was mixed at 150 rpm for two minutes, followed by mixing at 60 rpm for an additional two minutes. The stirrer was turned off and the mixture allowed to settle for five minutes, after which the clarity of the mixture was determined. If no flocculation or clarity was observed, the samples were discarded and the method was repeated using additional cationic polymer (up to 1200 ppm). Optimization of the aluminum sulfate may be done, but is not required. The treated samples were gravity-filtered through 25-micron filter paper and the water layer was used to determine chemical oxygen demand (COD) and turbidity.

Chemical oxygen demand (COD) was determined under limited and controlled conditions described in *Standard Methods For The Examination of Water and Wastewater*, 18th Edition (1992), procedure No. 5220 D. Since many of the additives used in metalworking fluids are water-soluble, high COD levels are still obtained despite splitting the surfactants of the instant invention and obtaining distinct phase separation. Turbidity was determined by the nephelometric method under limited and controlled conditions described in *Standard Methods For The Examination of Water and Wastewater*, 18th Edition (1992), procedure No. 2130 B.

Treatment studies were performed using conventional nonionic surfactants and the nonionic, splittable surfactants of the instant invention. To simulate a typical metalworking fluid, a mixture of water, triethanolamine, orthoboric acid, sodium omadine, and ethylenediaminetetraacetic acid disodium salt was used in these studies. Formulations were then made with this mixture. In one case, 5 wt. percent surfactant and 5 wt. percent Ergon Refining Hygold V-200 (Vicksburg, Miss.) oil was added to this mixture. The results of the waste-treatment of this mixture are given in Table G. To determine matrix effects on the waste-treatment of the surfactants of the instant invention, other formulations were prepared using surfactant (at 1 and 5 wt. percent), 5 (wt. percent) Ergon V-200 oil, and 1 (wt. percent) neodecanoic acid. The results of the waste-treatment of this mixture are given in Table H. Table G shows the result of waste-treatment, as evidenced by the reduction in COD levels (examples 4–9) by using the procedure described hereinabove for a typical metalworking fluid formulation which contains a nonionic, splittable surfactant of the instant invention, whereas the same formulation containing a conventional nonionic (e.g., Tergitol® NP-9) surfactant was not treatable under the same conditions (examples 10–15). Table H shows that matrix effects may also be present in metalworking formulations. At low surfactant concentration (1 wt. percent) a conventional nonionic surfactant (e.g., Tergitol® NP-9) can be waste treated (example 1A); however, when a fatty acid (e.g., neodecanoic acid) is added to the mixture, it is no longer waste treatable under the same conditions (example 2). Alternatively, the same mixture which instead contains a nonionic splittable surfactant of the instant invention is waste treatable under the same conditions (example 3). Furthermore, the nonionic splittable surfactant concentration in the mixture may be significantly increased while maintaining waste treatability (examples 12 through 17).

In order to determine the efficacy of the nonionic, splittable surfactants for metal cleaning, the following soak metal cleaning procedure was run and compared to standard commercial surfactants.

Stainless Steel 304-2B Alloy coupons (Stock No. SS-13) were purchased from The Q Panel Company, Cleveland, Ohio. A ¹⁄₁₆-inch hole was drilled in the coupon centered on one end so the coupon could hang vertically. Prior to use, the coupons were precleaned by two different methods. Procedure A used a methanol/potassium hydroxide solution. The panels were soaked overnight in the solution, rinsed with tap water, acetone, and allowed to dry at room temperature. Procedure B used a dishwashing liquid/water solution with a scrub brush. After cleaning, the coupons were rinsed with tap water, dipped in methanol, rinsed with acetone, and hung to dry at room temperature. The precleaned coupons were weighed on an analytical balance to 4 decimal places (0.0000 g). The coupons were soiled by immersing 80–85% (approx. 2.5 inches) of the coupon in test oil, followed by a vertical hang for one hour. After this time, the excess oil bead at the bottom of the coupon was wiped off with a 1-inch, sponge-type paint brush. The coupon was then reweighed to determine the amount of oil residue on the panel. Solutions of builders, solvents and surfactants were used as the cleaning media. Typically, a 1-L aqueous solution with the following formulation was prepared: 0.1 wt. percent sodium hydroxide, 0.1 wt. percent of surfactant, 0.1 wt. percent of sodium metasilicate (anhydrous), and 0.1 wt. percent of sodium carbonate. The solutions were placed in beakers in a bath regulated to the desired temperature (+/−2_C). A typical range of temperatures was 40, 60 and 80° C. Soiled coupons were hung on the rotating mechanisms and immersed in the solutions for cleaning. Rotation of the coupons was at 15+/−2 rpm. The wash cycle was 5 minutes or less, followed by a rinse in distilled water. The distilled water was run into a 1000-ml beaker and the coupon was rinsed in the beaker in such a manner as not to contact the flow of water (which might have aided in the additional removal of some of the oil). After rinsing, the coupons were again hung vertically and allowed to air-dry. When dry, the coupons were weighed to determine the amount of oil residue remaining on the coupon after cleaning. The cleaning efficacy was determined by the amount of residue, divided by the amount of oil deposited, multiplied by 100 to determine the percent oil removed.

$$\frac{\text{Amount of Residue}}{\text{Amount of Oil deposited}} \times 100 = \% \text{ of Oil removed}$$

The results are given in Table I. As the results show, many of the splittable, nonionic surfactants of the instant invention show equal or better cleaning performance than conventional nonionic surfactants which are known to be good metal cleaning agents (e.g., Triton® X-100).

TABLE 1

| Acetals | Ketone (grams) | Polyol (grams) | Diluent (mls) heptane | Catalyst (gms) p-TsOH | Reaction Time (hrs) | Extraction | Distillation °C./mm Hg | Yield (%) | Molecular Weight |
|---|---|---|---|---|---|---|---|---|---|
| A | 2-Octanone (516.9) | ***(442.9) | (441) | (0.36) | 28 | No | 190°/6 mm | 91.9 | 202.3 |
| B | 2-Octanone (449.3) | *(564.2) | (297) | (0.34) | 15 | No | 192/5 mm | 94.2 | 244.4 |
| C | 2-Octanone (645.3) | ***(480.8) | (446) | (0.32) | 111 | Yes | Kettle product(1) | 81.0 | 230.4 |
| D | 3-Octanone (512.8) | *(563.9) | (304) | (0.32) | 40 | Yes | 187°/5 mm | 56.8 | 244.4 |
| E | 2-Nonanone (435.3) | ***(331.7) | (500) | (0.53) | 24 | No | 190–200°/6 mm | 92.4 | 216.3 |
| F | 3-Nonanone (428.4) | ***(332.0) | (424) | (0.51) | 24 | No | 190–200°/6mm | 92.4 | 216.3 |
| G | 5-Nonanone (427.5) | ***(331.5) | (461) | (0.50) | 22 | No | 196–200°/6 mm | 86.5 | 216.3 |
| H | 2-Decanone (281.9) | ***(209.6) | (465) | (0.33) | 15 | No | 190–200°/6 mm | 98.6 | 230.3 |
| I | 2-Undecanone (195.0) | ***(126.5) | (400) | (0.20) | >24 | No | 190–200°/6 mm | 66.0 | 244.3 |
| J | 2-Dodecanone (460.7) | ***(276.5) | (411) | (0.51) | 24 | No | 190–200°/6 mm | 89.0 | 258.3 |
| K | 2-Tridecanone (498.7) | ***(276.7) | (463) | (0.52) | 15 | No | 190–200°/6 mm | 72.1 | 272.3 |
| M | 4-tert-Butyl-cyclohexanone (463.2) | ***(304.5) | (805) | (0.25) | 62.5 | No | 190–195°/5 mm | 94.3 | 228.3 |
| N | 2-Methyl-4-nonanone (431.3) | ***(331.4) | (282) | (0.42) | 24 | No | 190–195°/6–10 mm | 31.5 | 230.4 |
| O | C12–C14 Mixed ketones (793.7) | ***(443.2) | (500) | (0.30) | 16 | Yes | 190–196°/3–5 mm | 68.3 | 272.3 | p-toluenesulfonic acid monohydrate
*TMP 2-ethyl-2-(hydroxymethy1)-1,3-propanediol
**TME 1,1,1-tris(hydroxymethyl)ethane
***glycerol
(1) material refined using wiped film evaporator
2-Octanone, 3-Octanone, 5-Nonanone, 2-Undecanone, 4-tert-Butylcyclohexanone, Glycerol, TMP, TME, and available from Aldrich Chemical Company, Inc. Milwaukee, WI
2-Nonanone, 3-Nonanone, 2-Decanone, 2-Dodecanone, 2-Tridecanone available from Bedoukian Research Inc. Danbury, CT
2-Methyl-4-nonanone available from Wiley Organics Coshocton, OH
C11 mixed ketones obtained from Eastman
C12–C14 mixed ketones obtained from Nippon Shokubai

TABLE A

| Examples | Acetals | \multicolumn{4}{c}{Percent Detergency moles EO} | Standard (1) 9EO | Standard (2) 7.5 |
|---|---|---|---|---|---|---|---|
| | | 3EO | 6EO | 9EO | 12EO | | |
| 1 | A | 23.36 | 16.64 | 15.64 | 14.67 | 24.85 | 19.62 |
| 2 | E | 33.16 | 23.55 | 17.57 | 17.89 | 24.45 | 20.69 |
| 3 | F | 25.02 | 18.37 | 17.67 | 16.00 | 24.82 | 19.79 |
| 4 | G | 28.50 | 26.43 | 19.35 | 19.44 | 23.55 | 19.10 |
| 5 | H | 40.10 | 22.98 | 19.78 | 16.79 | 23.46 | 19.31 |
| 6 | I | 22.66 | 25.93 | 22.82 | 17.79 | 24.51 | 17.97 |
| 7 | J | 16.83 | 35.91 | 26.34 | 19.38 | 24.24 | 18.82 |
| 8 | K | 15.38 | 29.68 | 21.39 | 18.05 | 24.84 | |
| 9 | N | 19.00 | 21.33 | 22.51 | 19.48 | 25.14 | 19.31 |
| 10 | B | 46.67 | 44.01 | 43.54 | 40.19 | 39.49 | 38.78 |
| 11 | C | 37.68 | 30.98 | 38.09 | 30.43 | 41.41 | 42.90 |
| 12 | D | | 33.50 | | | | |
| 13 | L | 38.05 | 33.22 | 32.62 | 31.15 | 33.03 | |
| 14 | M | 29.79 | 31.37 | 30.15 | 27.60 | 37.16 | 29.35 |

Standard (1)-Tergitol ® NP-9
Standard (2)-Triton ® RW-75

TABLE B

| Examples | Acetals | Moles EO | Detergent Composition (wt. %) | | | | | | COD (mg/l) | | COD (mg/l) | |
|---|---|---|---|---|---|---|---|---|---|---|---|---|
| | | | a | b | c | d | e | f | Untreated | Treated (pH 3) | Untreated | Treated (pH 5) |
| 1 | O | 6 | 25 | 30 | 0 | 35 | 0 | 10 | 4390 | 2260 | 4110 | 4080 |
| 2 | O | 6 | 25 | 0 | 40 | 25 | 0 | 10 | 4050 | 680 | 3790 | 310 |
| 3 | O | 6 | 25 | 0 | 40 | 0 | 25 | 10 | 3680 | 870 | 3640 | 660 |
| 4 | O | 6 | 25 | 0 | 40 | 25 | 10 | 0 | 3780 | 1040 | 3900 | 2170 |
| 5 | O | 6 | 25 | 0 | 50 | 20 | 0 | 5 | 3770 | 500 | 4280 | 400 |
| 6 | O | 6 | 15 | 0 | 70 | 10 | 0 | 5 | 2950 | 540 | 3180 | 300 | a- surfactant
b- sodium tripolyphosphate
c- sodium metasilicate
d- sodium carbonate
e- sodium sulfate
f- Sipernat 50

TABLE C

| Examples | Acetals | Moles EO | Detergent Composition (wt. %) | | | | | Percent Detergency |
|---|---|---|---|---|---|---|---|---|
| | | | a | b | c | d | e | |
| 1 | O | 6 | 25 | 30 | 0 | 35 | 10 | 52.99 |
| 2 | O | 6 | 25 | 0 | 40 | 25 | 10 | 51.82 |
| 3 | O | 6 | 15 | 0 | 70 | 10 | 5 | 53.42 |
| 4 | Standard (1) | 9 | 25 | 30 | 0 | 35 | 10 | 35.20 |
| 5 | Standard (1) | 9 | 25 | 0 | 40 | 25 | 10 | 29.95 |
| 6 | Standard (1) | 9 | 15 | 0 | 70 | 10 | 5 | 28.02 |

Standard (1)- Tergitol ® NP-9
a- surfactant
b- sodium tripolyphosphate
c- sodium metasilicate
d- sodium carbonate
e- Sipernat 50

TABLE D

| Examples | Acetals | Moles EO | Formulation | Percent Detergency Standard (1) | Percent Detergency Standard (2) |
|---|---|---|---|---|---|
| 1 | O | 7.5 | a | 98.47 | 94.93 |
| 2 | H | 3 | a | 65.43 | 63.08 |
| 3 | J | 6 | a | 82.70 | 79.73 |
| 4 | L | 3 | a | 61.30 | 59.10 |
| 5 | O | 7.5 | b | 107.94 | 104.81 |
| 6 | H | 3 | b | 71.26 | 69.20 |
| 7 | J | 6 | b | 89.56 | 86.97 |
| 8 | L | 3 | b | 62.40 | 60.59 |

Standard (1)- Tergitol ® 15-S-9 = 100 percent
Standard (2)- Neodol ® 25-9 = 100 percent
Formulation:
a- 0.25 wt. percent surfactant
b- 0.30 wt. percent surfactant, 0.70 wt. percent sodium carbonate

TABLE E

| Examples | Acetals | Moles EO | Emulsion Stability after 1 hour | Emulsion Stability After 24 hours |
|---|---|---|---|---|
| 1 | O | 3 | slight foam/emulsified | clear/3 layers |
| 2 | O | 6 | slight foam/emulsified | clear/nonemulsified |
| 3 | O | 7.5 | foam/emulsified | small separation/not clear |
| 4 | O | 9 | foam/emulsified | clear/nonemulsified |
| 5 | Standard (1) | 4 | emulsified | emulsified |
| 6 | Standard (2) | 6 | emulsified | small separation/not clear |
| 7 | Standard (3) | 9 | foam/emulsified | clear/nonemulsified |

Standard (1)- Tergitol ® NP-4
Standard (1)- Tergitol ® NP-6
Standard (1)- Tergitol ® NP-9

TABLE F

| Examples | Acetals | Moles EO | Concentration (wt. percent) | Foam height (mm) Time 0 min./ 5 min. | Concentration (wt. percent) | Foam height (mm) Time 0 min./ 5 min. |
|---|---|---|---|---|---|---|
| 1 | A | 9 | 0.1 (wt. %) | 63/4 | 1.0 (wt. %) | 125/15 |
| 2 | E | 9 | 0.1 (wt. %) | 75/10 | 1.0 (wt. %) | 123/8 |
| 3 | F | 9 | 0.1 (wt. %) | 20/0* | 1.0 (wt. %) | 125/13 |
| 4 | G | 9 | 0.1 (wt. %) | 40/0* | 1.0 (wt. %) | 95/3 |
| 5 | H | 9 | 0.1 (wt. %) | 100/8 | 1.0 (wt. %) | 116/13 |
| 6 | I | 9 | 0.1 (wt. %) | 118/23 | 1.0 (wt. %) | 138/28 |
| 7 | J | 9 | 0.1 (wt. %) | 115/19 | 1.0 (wt. %) | 128/37 |
| 8 | K | 9 | 0.1 (wt. %) | 112/13 | 1.0 (wt. %) | 132/40 |
| 9 | M | 9 | 0.1 (wt. %) | 48/8 | 1.0 (wt. %) | 137/45 |
| 10 | O | 3 | 0.1 (wt. %) | 24/8 | 1.0 (wt. %) | 19/5 |
| 11 | O | 6 | 0.1 (wt. %) | 67/27 | 1.0 (wt. %) | 95/62 |
| 12 | O | 7.5 | 0.1 (wt. %) | 101/63 | 1.0 (wt. %) | 128/90 |
| 13 | O | 9 | 0.1 (wt. %) | 118/45 | 1.0 (wt. %) | 107/65 |
| 14 | O | 12 | 0.1 (wt. %) | 125/29 | 1.0 (wt. %) | 129/47 |
| 15 | O | 9 (1) | 0.1 (wt. %) | 99/10 | 1.0 (wt. %) | 74/5 |
| 16 | O | 12 (2) | 0.1 (wt. %) | 104/10 | 1.0 (wt. %) | |
| 17 | 0 | 12 (3) | 0.1 (wt. %) | 100/10 | 1.0 (wt. %) | |
| 18 | Standard | 9 | 0.1 (wt. %) | 100/90 | 1.0 (wt. %) | 120/105 |
| 19 | 0 | 9 | 0.1 (wt. %) | 135/35** | 1.0 (wt. %) | |
| 20 | 0 | 9(1) | 0.1 (wt. %) | 0/0** | 1.0 (wt. %) | |
| 21 | Standard | 9 | 0.1 (wt. %) | 95/55** | 1.0 (wt. %) | |

Temperature at 25° C.
Standard- Tergitol ® NP-9
*Foam collapsed < 30 seconds
**Temperature at 40–45° C.
(1) Capped with 8.6 moles of propylene oxide
(2) Capped with 4 moles of propylene oxide
(3) Capped with 7 moles of propylene oxide

TABLE G

| Examples | Acetals | Moles EO | Temp. (°C.) | Time (hrs.) | Cationic Poly (ppm) | Observation After Treatment appearance* | floc** | COD mg/l Initial | COD mg/l Final | Turbidity (NTU) Initial | Turbidity (NTU) Final |
|---|---|---|---|---|---|---|---|---|---|---|---|
| 1 | O | 9 | 50 | 2 | 100 | 5 | 3 | 3130 | 2780 | >200 | >200 |
| 2 | O | 9 | 50 | 2 | 300 | 5 | 3 | 3130 | 3080 | >200 | >200 |
| 3 | O | 9 | 50 | 2 | 600 | 5 | 3 | 3130 | 3130 | >200 | >200 |
| 4 | O | 9 | 50 | 3 | 100 | 1 | 3 | 3320 | 2120 | >200 | 0.6 |
| 5 | O | 9 | 50 | 3 | 200 | 1 | 3 | 3320 | 2270 | >200 | 0.4 |
| 6 | O | 9 | 50 | 3 | 300 | 1 | 3 | 3320 | 2150 | >200 | 0.6 |
| 7 | O | 9 | 60 | 2 | 100 | 1 | 3 | 3130 | 2160 | >200 | 1.7 |
| 8 | O | 9 | 60 | 2 | 200 | 1 | 3 | 3320 | 2240 | >200 | 1.3 |
| 9 | O | 9 | 60 | 2 | 300 | 1 | 3 | 3320 | 2250 | >200 | 1.1 |
| 10 | Standard | 9 | 50 | 3 | 100 | 5 | 3 | 2890 | 2780 | 74 | 37 |
| 11 | Standard | 9 | 50 | 3 | 300 | 5 | 3 | 2890 | 2940 | 74 | 38 |
| 12 | Standard | 9 | 50 | 3 | 600 | 5 | 3 | 2890 | 3150 | 74 | 30 |
| 13 | Standard | 9 | 60 | 2 | 100 | 5 | 3 | 2990 | 3106 | 74 | 31 |
| 14 | Standard | 9 | 60 | 2 | 300 | 5 | 3 | 2990 | 3000 | 74 | 35 |
| 15 | Standard | 9 | 60 | 2 | 600 | 5 | 3 | 2990 | 3290 | 74 | 28 |

Standard- Tergitol ® NP-9
*appearance (1–5) 1 = clear, 5 = cloudy
**floc (1–5) 1 = heavy floc, 5 = no floc

TABLE H

| Examples | Acetals | Surfactant Conc. (wt. %) | Moles | Temp. (°C.) | Time (hrs.) | Cationic Poly (ppm) | Observation After Treatment appearance* | floc** | COD (mg/l) Initial | COD (mg/l) Final | Turbidity (NTU) Initial | Turbidity (NTU) Final |
|---|---|---|---|---|---|---|---|---|---|---|---|---|
| 1(A) | Standard | 1 | 9 | 50 | 1 | 100 | 1 | 2 | 2330 | 1700 | 55 | 2.6 |
| 2 | Standard | 1 | 9 | 50 | 1 | 100 | 5 | — | 2490 | 2510 | >200 | >200 |
| 3 | O | 1 | 12 | 50 | 1 | 100 | 1 | 3 | 2470 | 1980 | 62 | 3.1 |
| 4 | O | 1 | 12 | 50 | 1 | 200 | 2 | 3 | 2470 | 2020 | 62 | 2.7 |
| 5 | O | 1 | 12 | 50 | 1 | 300 | 2 | 3 | 2470 | 2200 | 62 | 3.3 |
| 6 | O | 1 | 12 | 50 | 1 | 400 | 2 | 3 | 2470 | 2420 | 62 | 2.9 |
| 7 | O | 1 | 12 | 50 | 1 | 500 | 2 | 3 | 2470 | 2770 | 62 | 2.6 |
| 8 | O | 1 | 12 | 50 | 1 | 600 | 2 | 3 | 2470 | 1890 | 62 | 2.9 |
| 9 | Standard | 5 | 9 | 60 | 2 | 100 | 2 | 3 | 3540 | 3860 | >200 | 55 |
| 10 | Standard | 5 | 9 | 60 | 2 | 300 | 3 | 4 | 3540 | 3850 | >200 | 56 |
| 11 | Standard | 5 | 9 | 60 | 2 | 600 | 3 | 4 | 3540 | 3980 | >200 | 55 |
| 13 | O | 5 | 9 | 60 | 2 | 200 | 1 | 2 | 3400 | 2210 | >200 | 0.6 |
| 14 | O | 5 | 9 | 60 | 2 | 300 | 1 | 2 | 3400 | 2530 | >200 | 1.1 |
| 15 | O | 5 | 9 | 60 | 2 | 400 | 1 | 2 | 3400 | 2470 | >200 | 1 |
| 16 | O | 5 | 9 | 60 | 2 | 500 | 1 | 2 | 3400 | 2780 | >200 | 0.7 |
| 17 | O | 5 | 9 | 60 | 2 | 600 | 1 | 2 | 3400 | 2630 | >200 | 0.7 |

Standard- Tergitol ® NP-9
(A) does not contain neodecanoic acid
*appearance (1–5) 1 = clear, 5 = cloudy
**floc (1–5) 1 = heavy floc, 5 = no floc

TABLE I

| Examples | Acetals | Moles EO | Precleaning Procedure | Percent Oil Removed* |
|---|---|---|---|---|
| 1 | A | 3 | A | 49 |
| 2 | B | 3 | A | 74 |
| 3 | B | 6 | A | 100 |
| 4 | B | 9 | A | 65 |
| 5 | H | 3 | A | 86 |
| 6 | K | 6 | A | 98 |
| 7 | O | 3 | B | 47 |
| 8 | O | 6 | B | 68 |
| 9 | O | 9 | B | 85 |
| 10 | O | 12 | B | 91 |
| 11 | Standard (1) | 9 | B | 78 |
| 12 | Standard (2) | 10 | B | 83 |

*Average of five coupons
Standard (1)- Tergitol ® NP-9
Standard (2)- Triton ® X-100

We claim:

1. A method for removing impurities associated with a splittable, nonionic surfactant in an aqueous stream, comprising:
   (a) deactivating the surfactant to release the impurities from association with the surfactant by adjusting the pH of the aqueous stream to an acidic pH sufficient to split the surfactant irreversibly into a relatively water-insoluble fraction and a relatively water-soluble fraction, the released impurities and the water-insoluble fraction of the surfactant forming a relatively water-insoluble phase; and
   (b) removing at least a portion of the water-insoluble phase from the aqueous stream,
   wherein the splittable, nonionic surfactant is represented by either of, or mixtures of, the formulas:

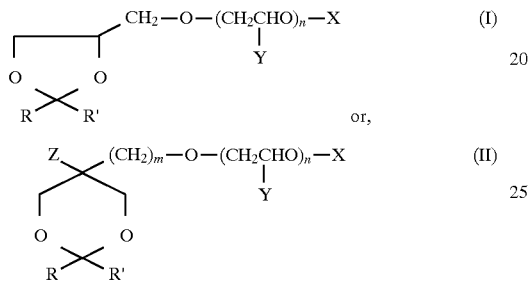

of which R and R' are the residue of an organic compound derived from a saturated ketone of the formula

wherein R and R' may be the same or different and are residues of an organic compound which contains a total of about 8 to about 20 carbon atoms and which does not contain a beta-alkoxy substituent or other moieties or linkages which significantly interfere with the performance of the surfactant for its intended purpose; X is hydrogen or the residue of a hydrophobic end-cap; Y is hydrogen, methyl, ethyl, or mixtures thereof; Z is hydrogen, methyl, or ethyl; m is 0 or 1; and n is an integer of 1 to about 40.

2. A method for cleaning fabric bearing hydrophobic contaminants, comprising:
   (a) contacting said fabric under basic conditions with an aqueous solution of a surfactant of either of, or mixtures of, the formulas

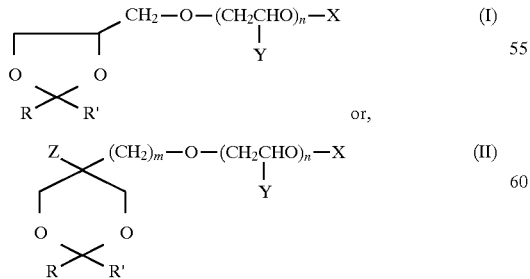

of which R and R' are the residue of an organic compound derived from a saturated ketone of the formula

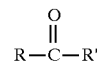

wherein R and R' may be the same or different and are residues of an organic compound which contains a total of about 12 to about 18 carbon atoms and which does not contain a beta-alkoxy substituent or other moieties or linkages which significantly interfere with the performance of the surfactant for its intended purpose; X is hydrogen or the residue of a hydrophobic end-cap; Y is hydrogen or methyl; Z is hydrogen, methyl, or ethyl; m is 0 or 1; and n is an integer of 1 to about 40;
   (b) removing an effluent stream comprising at least some of said hydrophobic contaminants in aqueous emulsion with said surfactant;
   (c) treating said effluent stream with an acidic material to reduce its pH sufficiently to cause the surfactant to irreversibly split into a ketone and a polyol, thereby causing the hydrophobic contaminants to be released from the emulsion to create a water-insoluble phase and a relatively contaminant-free aqueous phase; and
   (d) separating at least some of said water-insoluble phase from said aqueous phase.

3. A method of claim 2 wherein step (c) is conducted in the substantial absence of phosphates.

4. A method of claim 2 wherein the ketone is a mixture of $C_{12}$ to $C_{14}$ ketones.

5. A method of claim 2 wherein the acetal moiety has a molecular weight of at least about 260.

6. A method of claim 1 wherein the impurities comprise an emulsion of hydrophobic materials.

7. A method for cleaning a hard surface which is contaminated with hydrophobic contaminants, comprising:
   (a) contacting said hard surface with a composition comprising an aqueous solution of a nonionic, splittable surfactant having either of, or mixtures of, the formulas

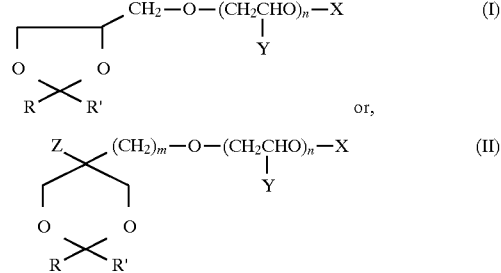

of which R and R' are the residue of an organic compound derived from a saturated ketone of the formula

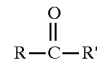

wherein R and R' may be the same or different and are residues of an organic compound which contains a total of about 8 to about 20 carbon atoms and which does not contain a beta-alkoxy substituent or other moieties or linkages which significantly interfere with the performance of the surfactant for its intended purpose; X is hydrogen or the residue of a hydrophobic end-cap; Y is hydrogen, methyl, ethyl, or mixtures thereof; Z is hydrogen, methyl, or ethyl; m is 0 or 1; and n is an integer of 1 to about 40;

(b) removing an effluent stream comprising at least some of said hydrophobic contaminants in aqueous emulsion with said surfactant;

(c) treating said effluent stream with an acidic material to reduce its pH sufficiently to cause the surfactant to irreversibly split into a ketone and a polyol, thereby causing the hydrophobic contaminants to be released from the emulsion to create a water-insoluble phase and a relatively contaminant-free aqueous phase; and (d) separating at least some of said water-insoluble phase from said aqueous phase.

8. A method for metalworking comprising:

(a) contacting a metal bearing hydrophobic materials with a composition comprising an aqueous solution of a nonionic, splittable surfactant having either of, or mixtures of, the formulas

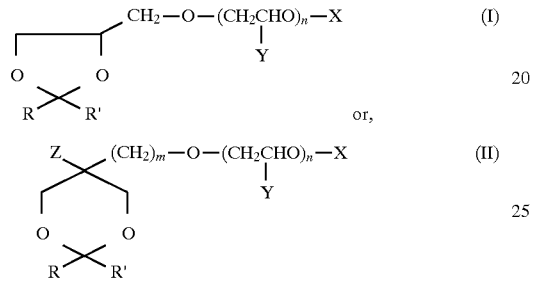

of which R and R' are the residue of an organic compound (substituted or unsubstituted) derived from a saturated ketone of the formula

wherein R and R' may be the same or different and are residues of an organic compound which contains a total of about 8 to about 20 carbon atoms and which does not contain a beta-alkoxy substituent or other moieties or linkages which significantly interfere with the performance of the surfactant for its intended purpose; X is hydrogen or the residue of a hydrophobic end-cap; Y is hydrogen, methyl, ethyl, or mixtures thereof; Z is hydrogen, methyl, or ethyl; m is 0 or 1; and n is an integer of 1 to about 40;

(b) removing an effluent stream comprising at least some of said hydrophobic materials in aqueous emulsion with said surfactant;

(c) treating said effluent stream with an acidic material to reduce its pH sufficiently to cause the surfactant to irreversibly split into a ketone and a polyol, thereby causing the hydrophobic materials to be released from the emulsion to create a water-insoluble phase and a relatively hydrophobic material-free aqueous phase; and (d) separating at least some of said water-insoluble phase from said aqueous phase.

9. A method for de-inking comprising:

(a) mixing a waste paper, having a plurality of attached ink particles, with water to form an aqueous waste paper slurry;

(b) treating said waste paper slurry with a composition comprising an aqueous solution of a nonionic, splittable surfactant having either of, or mixtures of, the formulas

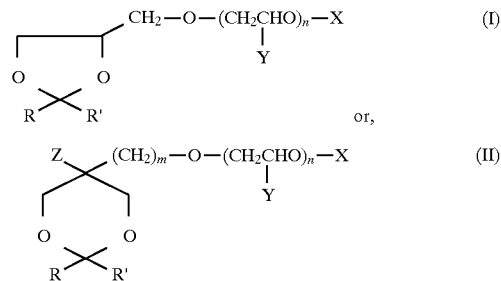

of which R and R' are the residue of an organic compound derived from a saturated ketone of the formula

wherein R and R' may be the same or different and are residues of an organic compound which contains a total of about 8 to about 20 carbon atoms and which does not contain a beta-alkoxy substituent or other moieties or linkages which significantly interfere with the performance of the surfactant for its intended purpose; X is hydrogen or the residue of a hydrophobic end-cap; Y is hydrogen, methyl, ethyl, or mixtures thereof; Z is hydrogen, methyl, or ethyl; m is 0 or 1; and n is an integer of 1 to about 40, with sufficient agitation of said slurry so as to dislodge said ink particles from said paper and associate said ink particles with said composition, thus forming a pulp and an ink/surfactant/water mixture;

(c) concentrating the pulp from the aqueous emulsion; and, (d) treating said effluent stream by adjusting the pH of the solution to an acidic pH sufficient to split the surfactant irreversibly into a relatively water-insoluble fraction and a relatively water-soluble fraction, thus allowing the ink to separate from the water; and, (e) separating at least some of said ink from the aqueous phase.

* * * * *